United States Patent
Park et al.

(10) Patent No.: US 9,082,445 B2
(45) Date of Patent: Jul. 14, 2015

(54) DISC CHUCKING STRUCTURE AND OPTICAL DISC DRIVE INCLUDING THE SAME

(71) Applicant: Toshiba Samsung Storage Technology Korea Corporation, Suwon-si (KR)

(72) Inventors: Byung-yeob Park, Suwon-si (KR); Seong-yeon Park, Suwon-si (KR); Bo-won Hwang, Suwon-si (KR); Jeong-hun Choe, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/654,648

(22) Filed: Oct. 18, 2012

(65) Prior Publication Data

US 2013/0111508 A1 May 2, 2013

(30) Foreign Application Priority Data

Oct. 27, 2011 (KR) .......................... 10-2011-0110698

(51) Int. Cl.
*G11B 17/028* (2006.01)

(52) U.S. Cl.
CPC .................. *G11B 17/0284* (2013.01)

(58) Field of Classification Search
CPC ........... G11B 17/028; G11B 17/0284–17/0286
USPC ........................ 720/600, 601, 695, 703–714
See application file for complete search history.

(56) References Cited

U.S. PATENT DOCUMENTS

| 4,855,990 | A  | * | 8/1989  | Akiyama ....................... 720/703 |
| 6,252,843 | B1 | * | 6/2001  | Begley et al. .................. 720/708 |
| 7,478,412 | B2 | * | 1/2009  | Huh et al. ...................... 720/706 |
| 7,565,670 | B2 | * | 7/2009  | Nishide ......................... 720/706 |
| 2002/0015374 | A1 | * | 2/2002 | Abe ............................... 369/77.1 |
| 2003/0218964 | A1 | * | 11/2003 | Kurita et al. .................. 369/249 |
| 2007/0169140 | A1 | * | 7/2007 | Ogawa et al. ................. 720/712 |

FOREIGN PATENT DOCUMENTS

| JP | 09326147 A | * | 12/1997 | ........... G11B 17/028 |
| JP | 2000-306304 | | 11/2000 | |
| KR | 10-2009-0081492 | | 7/2009 | |

OTHER PUBLICATIONS

English translation of JP 09326147 A.*
Korean Office Action issued Jul. 24, 2013 in counterpart Korean Patent Application No. 10-2011-0110698 (3 pages, in Korean).

* cited by examiner

*Primary Examiner* — Nathan Danielsen
(74) *Attorney, Agent, or Firm* — NSIP Law (57) ABSTRACT

Provided is a disc clamping structure, a spindle structure, and an optical disc drive having the disc clamping structure. The disc clamping structure includes a chucking spring comprising a pressing portion pressing an upper surface of the clamper, and elastic portions surrounding the pressing portion and providing an elastic force toward the clamper. The disc clamping structure does not require a magnetic thrust as does the conventional optical disc drive.

20 Claims, 7 Drawing Sheets

DISC CHUCKING STRUCTURE AND OPTICAL DISC DRIVE INCLUDING THE SAME

CROSS-REFERENCE TO RELATED APPLICATION(S)

This application claims the benefit under 35 USC §119(a) of Korean Patent Application No. 10-2011-0110698, filed on Oct. 27, 2011, in the Korean Intellectual Property Office, the entire disclosure of which is incorporated herein by reference for all purposes.

BACKGROUND

1. Field

The following description relates to a disc chucking structure, a spindle structure, and a spindle motor of an optical disc drive.

2. Description of Related Art

An optical disc drive typically includes a spindle structure on which a disc is mounted. The spindle structure may include a turn table or spindle on which a disc is mounted, a rotational chuck for fixing the disc on the turn table, and a spindle motor for rotating the spindle.

In a typical optical disc drive, a chucking structure may be a magnetic chucking structure. In this regard, a magnet is provided to a rotational chuck to stably fix a disc on the spindle, and a yoke corresponding to the magnet is provided to the spindle.

In the magnetic chucking structure, during disc chucking, it is difficult to prevent noise that occurs due to a collision between the spindle and the rotational chuck. In addition, the magnetic material of the chucking structure is typically made of neodymium (Nd), which is an expensive rare-earth metal. The use of such a rare magnetic material contributes to a substantial increase in manufacturing costs for the chucking structure.

SUMMARY

In an aspect, there is provided a disc clamping structure including a spindle on which a disc is mounted, a clamper configured to fix the disc to the spindle, and a chucking spring comprising a pressing portion that is configured to press on an upper surface of the clamper, and elastic portions surrounding the pressing portion which are configured to provide an elastic force toward the clamper.

The disc clamping structure may further comprise a lubricating element interposed between the pressing portion and the clamper.

The lubricating element may comprise a separate wear-resistant sheet.

The elastic portions may be arranged at equiangular intervals around the pressing portion.

The elastic portions may comprise a linear or an arch shape.

The elastic portions may surround the pressing portion in a helix shape.

The disc clamping structure may further comprise a protruding rotation support that is formed at the center of an upper surface of the clamper, corresponding to the pressing portion.

In an aspect, there is provided a disc spindle structure including a disc clamping structure comprising, a spindle on which a disc is mounted, a clamper configured to fix the disc to the spindle, and a chucking spring comprising a pressing portion configured to press on an upper surface of the clamper, and elastic portions surrounding the pressing portion which are configured to provide an elastic force toward the clamper, a spindle motor configured to rotate the spindle, a cover which covers a space for the disc and which includes the clamper and the disc chucking spring, and a main base which includes the spindle motor and which ascends toward and/or descends from the cover.

The elastic portions may comprise a linear or an arch shape.

The elastic portions may surround the pressing portion in a helix shape.

A protruding rotation support may be formed at the center of an upper surface of the clamper, corresponding to the pressing portion.

The protruding rotation support may be integrated with the clamper.

The protruding rotation support and the clamper may be formed of different materials.

The disc clamping structure may further comprise a lubricating element interposed between the pressing portion and the clamper.

In an aspect, there is provided an optical disc drive including a disc clamping structure comprising a spindle on which a disc is mounted, a clamper configured to fix the disc to the spindle, and a chucking spring comprising a pressing portion configured to press on an upper surface of the clamper, and elastic portions surrounding the pressing portion which are configured to provide an elastic force toward the clamper, an optical pickup unit configured to write information on the disc and/or read information from the disc, a tray configured to transport the disc, a spindle motor configured to rotate the spindle, a cover which covers a space for the disc and which includes the clamper and the disc chucking spring, a main base which includes the spindle motor and which ascends toward or descends from the cover, and a main frame to which the main base is provided.

The elastic portions may comprise a linear or an arch shape.

The elastic portions may surround the pressing portion in a helix shape.

A protruding rotation support may be formed at the center of an upper surface of the clamper, corresponding to the pressing portion.

The protruding rotation support may be integrated with the clamper.

The protruding rotation support and the clamper may be formed of different materials.

The optical disc drive may comprise a non-magnetic lifting force controlling structure to suppress a lifting force that occurs due to high-speed rotation of the spindle motor.

The non-magnetic lifting force controlling structure may be provided by the chucking spring pressing the spindle.

The disc clamping structure may further comprise a lubricating element interposed between the pressing portion and the clamper.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
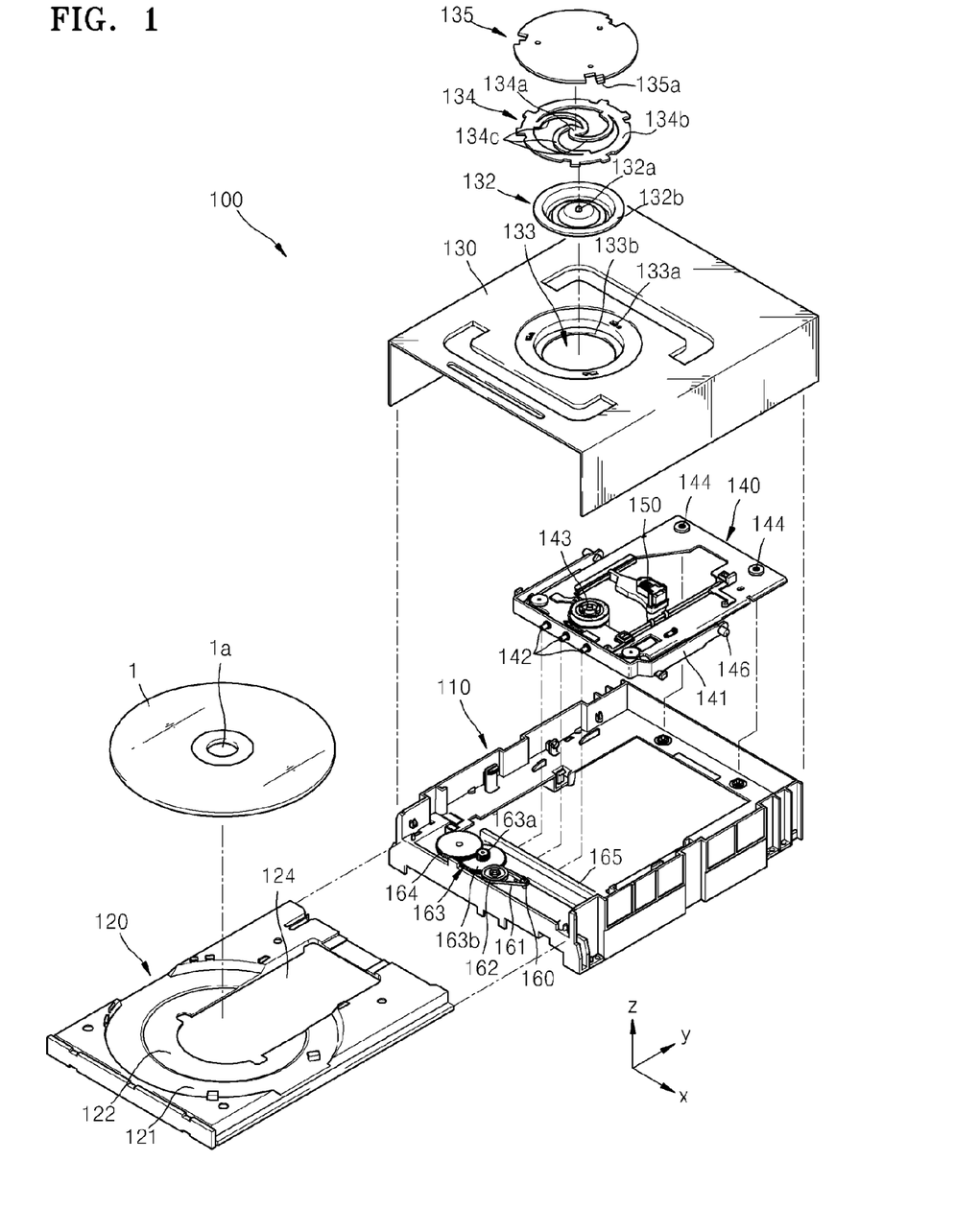
FIG. 1 is a diagram illustrating an example of a disc drive.

FIG. 1 illustrates an example of a disc drive 100.

Referring to FIG. 1, the disc drive 100 includes a main frame 110, a tray 120, and a cover 130 that is connected to the main frame 110 to prevent exposure of the inside of the main frame 110. An optical disc 1 that has a center hole 1a may be mounted on the tray 120. The tray 120 may move into and out of the main frame 110. The main frame 110 may be a half height (H/H) main frame.

A clamper 132 may fix the optical disc 1 on a spindle 143 (also referred to as a turn table). The clamper 132 includes a protruding rotation support 132a that contacts a lower surface of a pressing portion 134a of the chucking spring 134 at the center of a upper surface of the clamper 132. The clamper 132 also includes a centering pin 132c (see FIGS. 3 and 7) that is inserted into a center hole 143d of the spindle 143 at a lower surface of the clamper 132, and a flange 132b. The clamper 132 is surrounded by a ring-shape flange 132b corresponding to a skirt portion 133b surrounding an opening 133. In this example, the clamper 132 is inserted into the opening 133 of the cover 130, and the chucking spring 134 is provided thereon to elastically bias the clamper 132.

A cap 135 is provided on the chucking spring 134 to close the opening 133 and to fix the chucking spring 134 to the opening 133. The chucking spring 134 includes the pressing portion 134a that presses a center of an upper surface of the clamper 132, an edge 134b fixed on the surrounding of the opening 133, and a plurality of elastic portions 134c interposed between the pressing portion 134a and the edge 134b. A plurality of fixing holes 133a are formed around the outside of the opening 130, and a plurality of 'L' type fixation jaws 135a, which are to be hooked by the fixing holes 133a, protrude around the cap 135.

The tray 120 may include various optical elements. For example, the tray 120 may include a first mounting portion 121 for mounting the optical disc 1 thereon, and a second mounting portion 122 for mounting a mini optical disc (not shown). For example, the optical disc 1 may have a diameter of 120 mm and the mini optical disc may have a diameter of 80 mm. The first mounting portion 121 is recessed more than its surroundings to allow the optical disc 1 having a diameter of 120 mm to be mounted thereon. The second mounting portion 122 is recessed more than the first mounting portion 121 to allow a mini optical disc to be mounted thereon. When the optical disc 1 mounted on the tray 120 is inserted into the inside of the main frame 110, the spindle 143 may access the optical disc 1. The tray 120 includes an open window 124 for exposing light irradiated by an optical pickup unit 150 onto the optical disc 1.

The disc drive 100 includes a main base 140 that is vertically movable with respect to the main frame 110, and a movable sub base 141 that guides the vertical movement of the main base 140 by a rotational axis 146 that is movably connected to the main frame 110. The main base 140 may include a spindle motor 147 (see FIG. 3) for driving the spindle 143 to rotate the optical disc 1. The main base 140 may include the optical pickup unit 150 which irradiates light to the rotating optical disc 1 and which receives light reflected by the optical disc 1 to write information on the optical disc 1 and/or to read written information from the optical disc 1.

The main base 140 may be flexibly movably connected on the main frame 110 through fixing holes 144 which are located on a rear end thereof by using, for example, a screw with an elastic rubber spacer (not shown) interposed therebetween. When the main frame 110 is elevated, the optical disc 1 mounted on the spindle 143 is pressed by the clamper 132. In this example, the spindle 143 does not have a yoke which is required in a typical magnetic clamping structure. Because the clamper 132 is elastically biased by the chucking spring 134, the clamper 132 may apply an appropriate level of pressure to the optical disc 1 to fix the optical disc 1 on the spindle 143.

A front end of the main base 140 is coupled to the movable sub base 141 which is movable with respect to the main slider 165. Accordingly, the main base 140 may be moved by the main slider 165 that reciprocates in synchronization with the movement of the tray 120. A plurality of guide pins 142 are located around the middle of the movable sub base 141, and prevent vertical motion due to the main slider 165. In this example, a power delivery system may be used to move the tray 120 and the main slider 165. The power delivery system includes a driving pulley 160 that rotates by a driving motor (not shown), a rubber belt 161, a secondary pulley 162, a main gear 163, and a tray driving gear 164.

Figure 2:
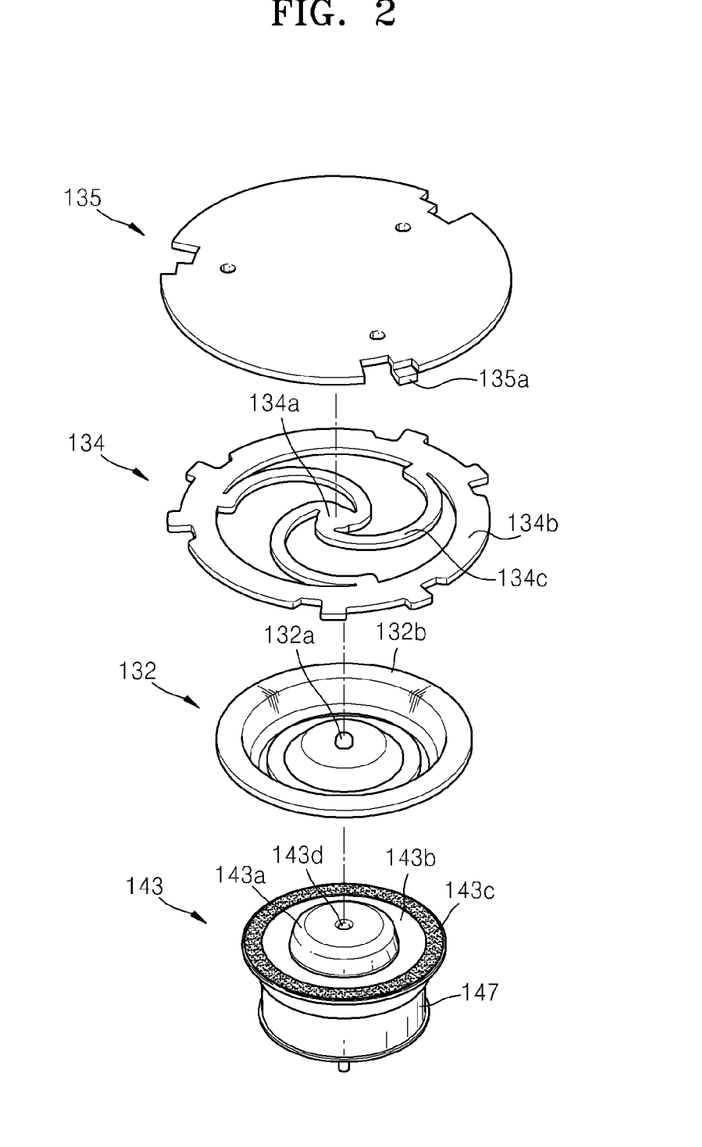
FIG. 2 is a diagram illustrating an example of elements that constitute a spindle structure.

FIG. 2 illustrates an example of the elements that constitute a spindle structure.

Referring to FIG. 2, the spindle 143 is coupled to the spindle motor 147, and the clamper 132 is located on the spindle 143. The clamper 132 may be used to fix a disc such as a CD, DVD, Blu-ray, and the like to the spindle 143. A center cone 143a protrudes at the center of the upper surface of the spindle 143. The center cone 143a may be inserted into the center hole 1a of the optical disc 1 (see FIG. 1). A ring-type pad 143c that contacts a lower surface of a surrounding portion of the center hole 1a of the optical disc 1 and prevents slipping, is located on an upper surface of a rim 143b surrounding the center cone 143a.

The clamper 132 fixes the optical disc 1 to the spindle 143 by the chucking spring 134. The chucking spring 134 includes the pressing portion 134a that presses the protruding rotation support 132a at the center of the upper surface of the clamper 132, the edge 134b surrounding the pressing portion 134a, and elastic portions 134c which may be arranged at equiangular intervals surrounding the pressing portion 134a between the pressing portion 134a and the edge 134b. For example, the elastic portions 134c may be formed in a helix shape. The helix shape of the elastic structure may provide excellent flexibility and restoring power, and also, suppress twisting of the elastic portions 134c as a result of the rotation of the spindle 143. As another example, the elastic portion 134c may have a linear shape rather than the helix shape. The linear elastic portion 134c may be formed to be dislocated with respect to a rotational center of the spindle 143.

Figure 3:
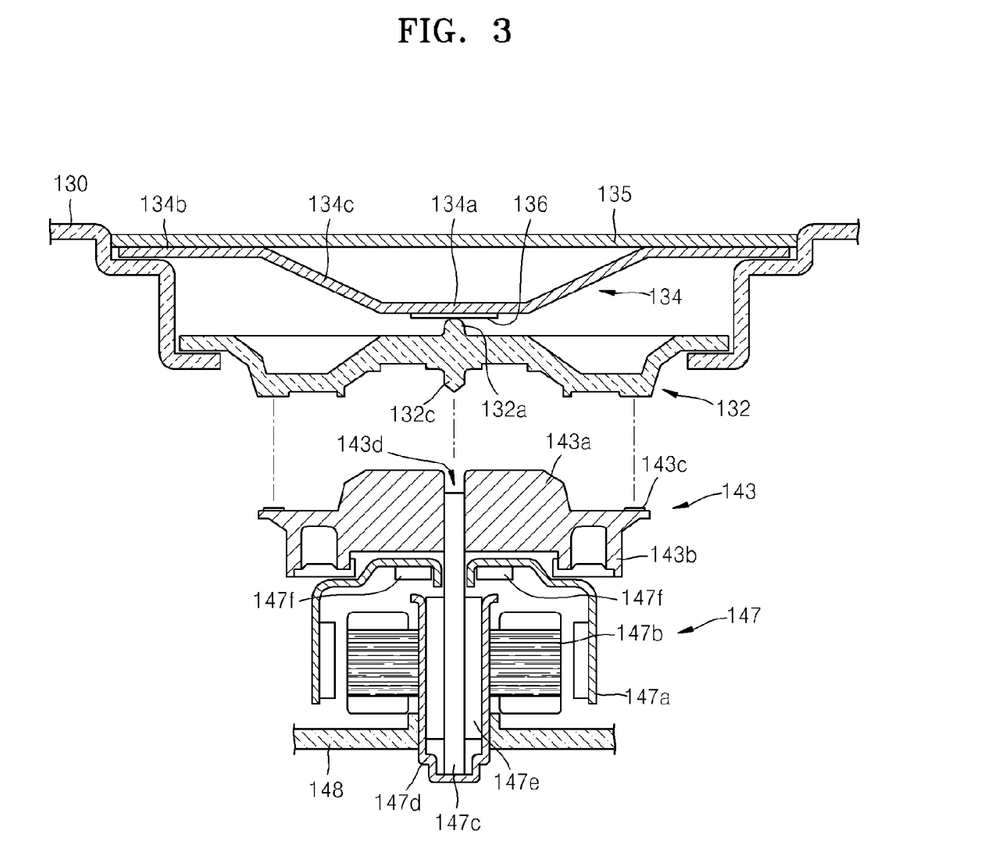
FIG. 3 is a diagram illustrating an example of a state in which a disc is chucked on a chucking structure.

FIG. 3 illustrates an example of a state in which the optical disc 1 is chucked on a chucking structure.

Referring to FIG. 3, the chucking structure includes the spindle 143, the clamper 132 that fixes the optical disc 1 on the spindle 143 while contacting and pressing the optical disc 1, and the chucking spring 134 pressing the clamper 132 against the spindle 143. The spindle structure includes the chucking structure and the spindle motor 147 for driving the spindle 143.

The spindle motor 147 is provided on the main base 140. A motor base 148 supporting a lower portion of the spindle motor 147 is directly fixed on the main base 140. In this example, the spindle 143 does not have a chucking magnet like in a typical spindle. Instead, a force for chucking the optical disc 1 is exerted by the chucking spring 134 pressing the spindle 143 against the clamper 132.

The spindle motor 147 includes a rotational axis 147c, a drum-shape rotator 147a coupled to the rotational axis 147c, and a stator 147b that is fixed inside the drum-shape rotator 147a and that is coupled to a fixed cylinder shaft 147d surrounding the rotational axis 147c. The fixed cylinder shaft 147d is fixed in an erect position on the motor base 148. A cylinder bearing 147e is located between the fixed cylinder shaft 147d and the rotational axis 147c.

FIG. 3 also illustrates a thrust magnet 147f which may or may not be included in the spindle motor 147. The thrust magnet 147f may reduce or remove an axial force of the drum-shaped rotator 147a which tends to move toward the spindle 143 due to a lifting force which occurs during high-speed rotation. However, because the chucking spring 134 presses the spindle 143 in a direction opposite to the lifting force, the lifting force may be reduced or removed. Accordingly, the thrust magnet 147f may not be included.

According to various aspects herein, instead of a magnetic lifting force controlling structure, a non-magnetic lifting force controlling structure may be used in an optical disc drive. The non-magnetic lifting force controlling structure may include a chucking spring 134 that helps with the chucking of the optical disc 1. The chucking spring may help with the chucking of the optical disc 1 and may suppress a lifting force.

According to various aspects herein, an expensive magnet, such as neodymium, is not used to chuck an optical disc. Instead, a function of a thrust magnet is provided by the chucking spring 134 that performs disc chucking, thereby reducing manufacturing costs of a motor.

Figure 4:
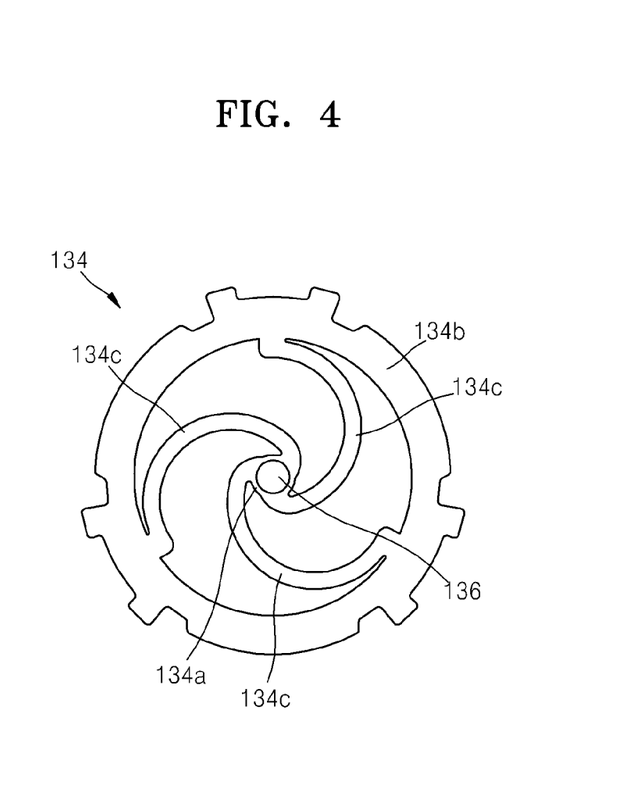
FIG. 4 is a diagram illustrating an example of a chucking spring included in a disc chucking structure.
Figure 5:
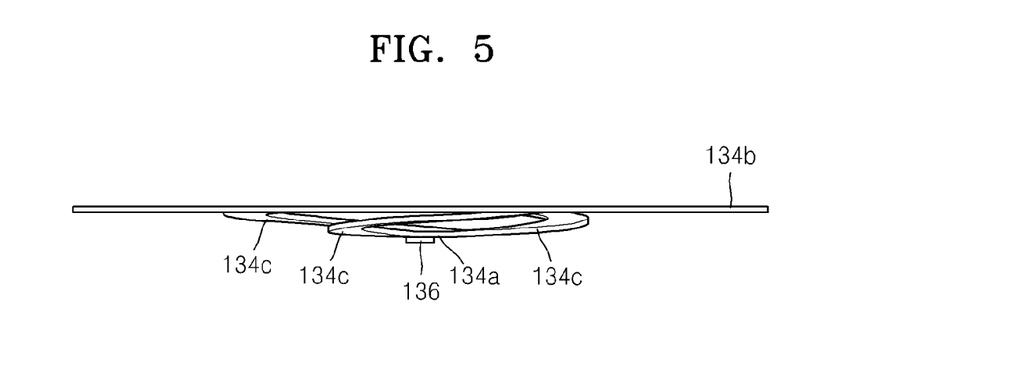
FIG. 5 is a diagram illustrating an example of a chucking spring included in a disc chucking structure according to an embodiment of the present invention.

FIG. 4 illustrates an example of a bottom view of the chucking spring 134, and FIG. 5 illustrates an example of a side view of the chucking spring 134.

As illustrated in FIG. 4, the chucking spring 134 includes the pressing portion 134a pressing a center of an upper surface of the clamper 132, the edge 134b fixed around the opening 133, and elastic portions 134c interposed between the pressing portion 134a and the edge 134b. As an example, the elastic portions 134c may be arranged at equiangular intervals around the pressing portion 134a, may have a helix shape or an arch form, and may surround the pressing portion 134a. For example, the elastic portions may have a linear or arch shape. Such a structure enables the elastic portions 134c to have sufficient lengths in a narrow space between the pressing portion 134a and the edge 134b.

As illustrated in FIG. 5, the pressing portion 134a protrudes from the edge 134b in a direction that is perpendicular to the surface of the chucking spring 134. The chucking spring 134 having the protruding pressing portion 134a has a flat compression spring structure. In addition, a wear-resistant lubricating member (or lubricating sheet) 136 may be attached to a lower surface of the pressing portion 134a that is to contact the protruding rotation support 132a of the clamper 132. The lubricating member 136 may prevent wearing and reduce friction of the rotation support 132a that occurs due to a high-speed rotation around the protruding rotation support 132a. For example, the wear-resistant lubricating member 136 may be manufactured as a high-hardness polymer film, an inorganic material film having a lubricating property, and the like. A surface of the lubricating member 136 may be coated with a lubricating cream.

According to various aspects, the wear-resistant lubricating member 136 may also have a sheet form. As another example, the wear-resistant lubricating member 136 may be formed by using a flat oil-less bearing material. As another example, the wear-resistant lubricating member 136 may be integrated with the pressing portion 134a. In this example, the pressing portion 134a may function as a lubricating member.

Figure 6:
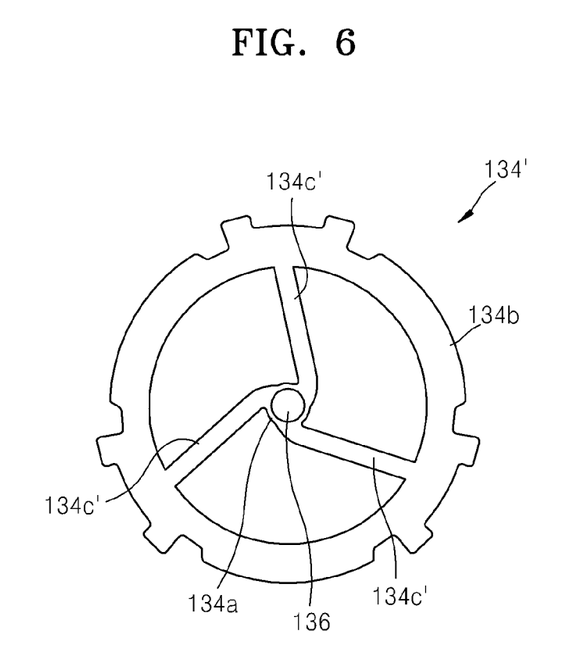
FIG. 6 is another diagram illustrating an example of a chucking spring.

In some examples, the elastic portions 134c may be formed linearly. FIG. 6 illustrates another example of a chucking spring 134' of the elastic portion 134c. In this example, the chucking spring 134' includes the pressing portion 134a pressing a center of an upper surface of the clamper 132, the edge 134b fixed on the surrounding of the opening 133, and linear elastic portions 134c'. The linear elastic portions 134c are arranged at equiangular intervals surrounding the pressing portion 134a.

It should also be appreciated that the elastic portions 134c' surrounding the pressing portion 134a are not limited to the examples of the shapes illustrated in FIGS. 4 and 6 and may instead have other shapes. Such other shapes may be variously obtained by performing modification according to a design rule of a chucking spring.

Figure 7:
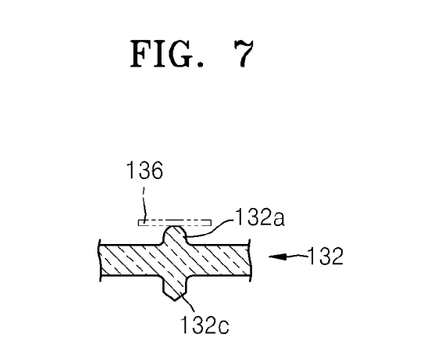
FIG. 7 is a diagram illustrating an example of a clamper included in a disc chucking structure.

FIG. 7 illustrates an example of the protruding rotation support 132a that is integrated with the clamper 132 at the center of an upper surface of the clamper 132 and the centering pin 132c formed at the center of a lower surface of the clamper 132.

Referring to FIG. 7, the protruding rotation support 132a contacts the pressing portion 134a or the wear-resistant lubricating member 136, and the centering pin 132c is inserted into the centering hole 143d of the spindle 143. The protruding rotation support 132a may cause friction while high-speed rotating of a disc with respect to the wear-resistant lubricating member 136 or the pressing portion 134a. Accordingly, even when the progress of the wearing is delayed by the wear-resistant lubricating member, friction damage to the protruding rotation support 132a over a long period of time may occur. The protruding rotation support 132a, unlike the clamper 132, may be formed using a high wear-resistant material.

Figure 8A:
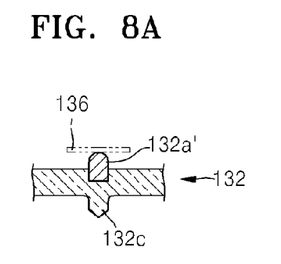
FIGS. 8A and 8B are diagrams illustrating other examples of a clamper of a disc chucking structure.
Figure 8B:
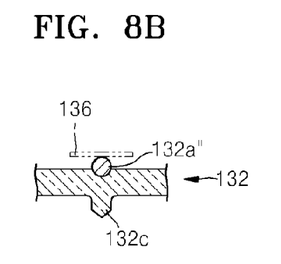

FIG. 8 illustrates an example of protruding rotation supports 132a' and 132a" formed using a material that is different from that of the clamper 132. The protruding rotation support 132a' in the example of FIG. 8A has a cylinder shape that has a sharp cone or round end, and the protruding rotation support 132a" of FIG. 8B has the shape of a ball. Each of the protruding rotation supports 132a' and 132a" may be fixed by molding a lower portion thereof at the center of the upper surface of the clamper 132.

Figure 9:
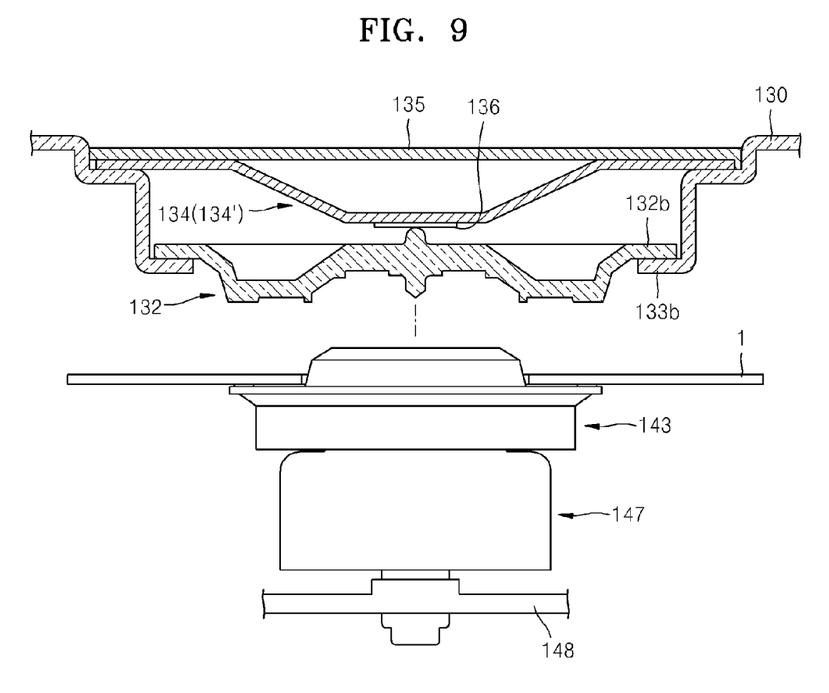
FIG. 9 is a diagram illustrating an example of a state in which a disc is loaded on a spindle.
Figure 10:
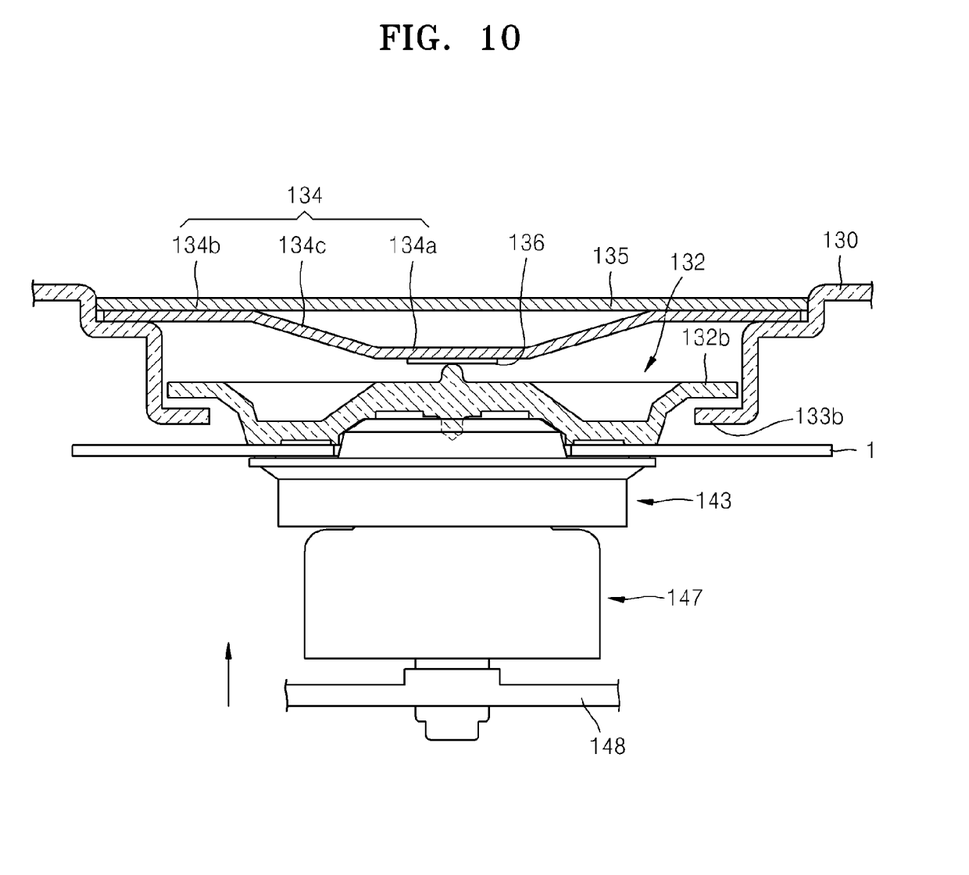
FIG. 10 is a diagram illustrating an example of a state in which a disc loaded on a spindle is chucked.

FIG. 9 and FIG. 10 respectively illustrate an unchucking and chucking state of the optical disc 1 according a location change of the main base 140. The main base 140 ascends and descends due to movement of the sub base in an optical disc drive.

Referring to FIG. 9, the optical disc 1 is loaded on the spindle 143 located above the spindle motor 147, and the clamper 132 is spaced apart from the spindle 143. This may be referred to as an initial state of the optical disc 1 or an unchucking state immediately after the clamper 132 is separated from the optical disc. In this example, the motor base 148 supporting the spindle motor 147 descends together with the main base 148 under the cover 130. The flange 132b of the clamper 132 is placed on an upper surface of the skirt portion 133b surrounding the opening 133 of the cover 130, and the chucking spring 134 fixed under the cap 135 presses the clamper 132 via the pressing portion 134a.

Referring to FIG. 10, when the optical disc 1 is loaded on the spindle 143 located above the spindle motor 147, the optical disc 1 is chucked on the spindle 143 by the clamper 132. In this example, the motor base 148 supporting the spindle motor 147 is elevated toward the cover 130 together with the main base 140 and the clamper 132 that is elastically biased by the chucking spring 134 is coupled to the spindle 143. In response, the flange 132b of the spindle 143 is separated from the skirt portion 133b of the cover 130, and the chucking spring 134 fixed under the cap 135 is compressed by the clamper 132. Accordingly, the clamper 132 strongly fixes the optical disc 1 on the spindle 143 using the chucking spring 134. The spindle 143 is rotated by the driving of the spindle motor 147, together with the clamper 132. The protruding rotation support 132a located at the center of the upper surface of the clamper 132 rotates while in contact with the location-fixed pressing portion 134a or the wear-resistant lubricating member 136 attached to the location-fixed pressing portion 134a. The wear-resistant lubricating member 136 helps the protruding rotation support 132a to rotate smoothly.

A clamping structure described herein has a spring tension force structure in which a clamper is coupled to a spindle by a flat spring. Accordingly, an expensive magnet is not required. Also, because the spring has a structure corresponding to the rotation of a disc and the spindle, distortion due to rotation and abnormal deformation due to the distortion may be prevented.

Furthermore, a wear-resistant lubricating member may be placed between the clamper rotating together with the spindle and a fixed spring pressing the clamper so as to help the clamper stably rotate. Therefore, even without a thrust magnet or a clamping magnet and a yoke for disc clamping, a disc may be stably clamped. A disc clamping structure and a spindle structure and an optical disc drive having the disc clamping structure are advantageous in terms of manufacturing costs in comparison to a typical structure.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A disc clamping structure comprising:
a spindle on which a disc is mounted, the spindle having a center hole;
a clamper configured to fix the disc to the spindle, the clamper comprising a protruding rotation support formed at the center of an upper surface of the clamper and integrated with the clamper and a centering pin formed at a lower surface of the clamper inserted into the center hole of the spindle; and
a chucking spring comprising a pressing portion configured to press on the protruding rotation support of the clamper, and elastic spring portions surrounding the pressing portion configured to provide an elastic force toward the clamper,
wherein the clamper is a single unitary structure, and
the chucking spring comprises an edge section with a non-uniform width, the edge section comprises sections of uniform width spaced apart from one another, and the sections of uniform width are separated from one another by pairs of protruding rectangular tabs spaced apart from one another and disposed in between indentations.

2. The disc clamping structure of claim 1, further comprising a lubricating element interposed between the pressing portion and the clamper.

3. The disc clamping structure of claim 2, wherein the lubricating element comprises a separate wear-resistant sheet.

4. The disc clamping structure of claim 1, wherein the elastic portions are arranged at equiangular intervals around the pressing portion.

5. The disc clamping structure of claim 1, wherein the elastic portions surround the pressing portion in a helix shape.

6. The disc clamping structure of claim 1, wherein the elastic portions comprise a linear or an arch shape.

7. The disc clamping structure of claim 5, wherein the pressing portion of the chucking spring where helical portions of the helix shape intersect are without holes.

8. The disc clamping structure of claim 4, wherein the elastic portions are each spaced apart by 120 degrees from one another.

9. A disc spindle structure comprising:
a disc clamping structure comprising:
a spindle on which a disc is mounted, the spindle having a center hole;
a clamper configured to fix the disc to the spindle, the clamper comprising a protruding rotation support formed at the center of an upper surface of the clamper and integrated with the clamper and a centering pin formed at a lower surface of the clamper inserted into the center hole of the spindle; and
a chucking spring comprising a pressing portion configured to press on the protruding rotation support of the clamper, and elastic spring portions surrounding the pressing portion configured to provide an elastic force toward the clamper;
a spindle motor configured to rotate the spindle;
a cover configured to cover a space for the disc and including the clamper and the chucking spring; and
a main base which includes the spindle motor and which ascends toward and/or descends from the cover,
wherein the clamper is a single unitary structure, and
the chucking spring comprises an edge section with a non-uniform width, the edge section comprises sections of uniform width spaced apart from one another, and the sections of uniform width are separated from one another by pairs of protruding rectangular tabs spaced apart from one another and disposed in between indentations.

10. The disc spindle structure of claim 9, wherein the elastic portions comprise a linear or an arch shape.

11. The disc spindle structure of claim 10, wherein the elastic portions surround the pressing portion in a helix shape.

12. The disc spindle structure of claim 9, wherein the protruding rotation support and the clamper are formed of different materials.

13. The disc spindle structure of claim 9, wherein the disc clamping structure further comprises a lubricating element interposed between the pressing portion and the clamper.

14. An optical disc drive comprising:
a disc clamping structure comprising:
    a spindle on which a disc is mounted, the spindle having a center hole;
    a clamper configured to fix the disc to the spindle, the clamper comprising a protruding rotation support formed at the center of an upper surface of the clamper and is integrated with the clamper and a centering pin formed at a lower surface of the clamper inserted into the center hole of the spindle; and
    a chucking spring comprising a pressing portion configured to press on the protruding rotation support of the clamper, and elastic spring portions surrounding the pressing portion configured to provide an elastic force toward the clamper;
an optical pickup unit configured to write information on the disc and/or read information from the disc;
a tray configured to transport the disc;
a spindle motor configured to rotate the spindle;
a cover configured to cover a space for the disc and which includes the clamper and the chucking spring;
a main base which includes the spindle motor and configured to ascend toward or descend from the cover; and
a main frame to which the main base is provided,
wherein the clamper is a single unitary structure, and
the chucking spring comprises an edge section with a non-uniform width, the edge section comprises sections of uniform width spaced apart from one another, and the sections of uniform width are separated from one another by pairs of protruding rectangular tabs spaced apart from one another and disposed in between indentations.

15. The optical disc drive of claim 14, wherein the elastic portions comprise a linear or an arch shape.

16. The optical disc drive of claim 14, wherein the elastic portions surround the pressing portion in a helix shape.

17. The optical disc drive of claim 14, wherein the protruding rotation support and the clamper are formed of different materials.

18. The optical disc drive of claim 14, wherein the optical disc drive comprises a non-magnetic lifting force controlling structure to suppress a lifting force that occurs due to high-speed rotation of the spindle motor.

19. The optical disc drive of claim 18, wherein the non-magnetic lifting force controlling structure is provided by the chucking spring pressing the spindle.

20. The optical disc drive of claim 14, wherein the disc clamping structure further comprises a lubricating element interposed between the pressing portion and the clamper.

* * * * *